US006424356B2

United States Patent
Chang et al.

(10) Patent No.: US 6,424,356 B2
(45) Date of Patent: *Jul. 23, 2002

(54) COMMAND OF FORCE SENSATIONS IN A FORCEBACK SYSTEM USING FORCE EFFECT SUITES

(75) Inventors: Dean C. Chang, Santa Clara; Jeffrey R. Mallett, Boulder Creek, both of CA (US)

(73) Assignee: Immersion Corporation, San Jose, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/306,002

(22) Filed: May 5, 1999

(51) Int. Cl.[7] .................................................. G09G 5/00
(52) U.S. Cl. ........................ 345/701; 345/156; 345/161; 345/702
(58) Field of Search .......................... 345/156, 161, 345/179, 333, 521, 700–702

(56) References Cited

U.S. PATENT DOCUMENTS

| | | |
|---|---|---|
| 3,919,691 A | 11/1975 | Noll |
| 4,414,984 A | 11/1983 | Zarudiansky |
| 4,477,043 A | 10/1984 | Repperger |
| 4,604,016 A | 8/1986 | Joyce |
| 4,706,294 A | 11/1987 | Ouchida |

(List continued on next page.)

FOREIGN PATENT DOCUMENTS

| | | |
|---|---|---|
| EP | 0626634 A2 | 11/1994 |
| WO | 95/20788 | 8/1995 |
| WO | 97/21160 | 6/1997 |
| WO | 97/31333 | 8/1997 |
| WO | 98/49614 | 11/1998 |
| WO | 98/58308 | 12/1998 |

OTHER PUBLICATIONS

Ramstein et al., "The Pantograph: A Large Workspace Haptic Device for a Multimodal Human–Computer Interaction," Computer–Human Interaction, CHI 1994, pp. 1–3.

(List continued on next page.)

Primary Examiner—Richard Hjerpe
Assistant Examiner—Henry N. Tran
(74) Attorney, Agent, or Firm—James R. Riegel; Paul M. Thyfault (57) ABSTRACT

A method and apparatus for commanding force effects using suites or categories to allow an application program higher level control over force sensations output by a force feedback interface device. An application program associates a force suite with one or more individual force effects and the suite association is provided to a library available to the application program on the host computer, such as an Application Programming Interface (API). A set of rules is also provided to the library, the rules determining how to apply the force effects in the suite based on a status of the application program. The application program commands at least one force effect in the suite and reports the status of the application program to the library, where the library applies the rules based on the reported status to cause a force sensation based on the commanded force effect to be output by a force feedback interface device coupled to the host computer.

26 Claims, 4 Drawing Sheets

U.S. PATENT DOCUMENTS

| | | | |
|---|---|---|---|
| 4,800,721 A | 1/1989 | Cemenska et al. | |
| 4,949,119 A | 8/1990 | Moncrief et al. | |
| 4,961,038 A | 10/1990 | MacMinn | |
| 4,983,901 A | 1/1991 | Lehmer | |
| 5,044,956 A | 9/1991 | Behensky et al. | |
| 5,076,517 A | 12/1991 | Ferranti et al. | |
| 5,116,180 A | 5/1992 | Fung et al. | |
| 5,146,566 A | 9/1992 | Hollis, Jr. et al. | |
| 5,184,319 A | 2/1993 | Kramer | |
| 5,185,561 A | 2/1993 | Good et al. | |
| 5,189,355 A | 2/1993 | Larkins et al. | |
| 5,220,260 A | 6/1993 | Schuler | |
| 5,223,776 A | 6/1993 | Radke et al. | |
| 5,286,203 A | 2/1994 | Fuller et al. | |
| 5,296,871 A | 3/1994 | Paley | |
| 5,341,459 A | 8/1994 | Backes | |
| 5,354,162 A | 10/1994 | Burdea et al. | |
| 5,366,376 A | 11/1994 | Copperman et al. | |
| 5,389,865 A | 2/1995 | Jacobus et al. | |
| 5,396,266 A | 3/1995 | Brimhall | |
| 5,414,337 A | 5/1995 | Schuler | |
| 5,414,620 A | 5/1995 | Kauffman | |
| 5,513,100 A | 4/1996 | Parker et al. | |
| 5,576,727 A | 11/1996 | Rosenberg et al. | |
| 5,625,576 A | 4/1997 | Massie et al. | |
| 5,629,594 A | 5/1997 | Jacobus et al. | |
| 5,634,794 A | 6/1997 | Hildreth et al. | |
| 5,691,898 A | 11/1997 | Rosenberg et al. | |
| 5,704,791 A | 1/1998 | Gillio | |
| 5,709,219 A | 1/1998 | Chen et al. | |
| 5,734,373 A * | 3/1998 | Rosenberg et al. | 345/161 |
| 5,739,811 A | 4/1998 | Rosenberg et al. | |
| 5,742,278 A * | 4/1998 | Chen et al. | 345/156 |
| 5,767,839 A | 6/1998 | Rosenberg | |
| 5,769,640 A | 6/1998 | Jacobus et al. | |
| 5,781,172 A | 7/1998 | Engel et al. | |
| 5,790,108 A | 8/1998 | Salcudean et al. | |
| 5,802,353 A | 9/1998 | Avila et al. | |
| 5,825,308 A | 10/1998 | Rosenberg | |
| 5,844,392 A | 12/1998 | Peurach et al. | |
| 5,889,670 A | 3/1999 | Schuler et al. | |
| 5,944,151 A | 8/1999 | Jakobs et al. | |
| 5,956,016 A | 9/1999 | Kuenzner et al. | |
| 5,956,484 A | 9/1999 | Rosenberg et al. | |
| 5,959,613 A | 9/1999 | Rosenberg et al. | |
| 5,973,689 A | 10/1999 | Gallery | 345/339 |
| 5,990,869 A | 11/1999 | Kubica et al. | |
| 6,004,134 A | 12/1999 | Marcus et al. | |
| 6,005,551 A | 12/1999 | Osborne et al. | |
| 6,020,876 A | 2/2000 | Rosenberg et al. | |
| 6,047,726 A | 4/2000 | Keyson | 345/156 |
| 6,088,017 A | 7/2000 | Tremblay et al. | |
| 6,100,874 A | 8/2000 | Schena et al. | 345/157 |
| 6,104,158 A | 8/2000 | Jacobus et al. | |
| 6,125,385 A | 9/2000 | Wies et al. | |
| 6,131,097 A | 10/2000 | Peurach et al. | 707/102 |
| 6,147,674 A | 11/2000 | Rosenberg et al. | 345/157 |
| 6,169,540 B1 | 1/2001 | Rosenberg et al. | 345/326 |
| 6,219,032 B1 | 4/2001 | Rosenberg et al. | 345/157 |
| 6,275,213 B1 | 8/2001 | Tremblay et al. | 345/156 |
| 6,292,170 B1 | 9/2001 | Chang et al. | 345/156 |
| 6,300,936 B1 | 10/2001 | Braun et al. | 345/156 |

OTHER PUBLICATIONS

Iwata et al., "Artificial Reality w/Force–Feedback: Development of Desktop Virtual Space with Compact Master Manipulator," Computer Graphics, vol. 24, No. 4, 1990, pp. 165–170.

Rosenberg, "A Force Feedback Programming Primer—For PC Gaming Peripherals Supporting I–Force 2.0 and Direct–X 5.0," 1997, Immersion Corporation, pp. 1–176.

Rosenberg, "Perceptual Design of a Virtual Rigid Surface Contact," 1993, Stanford University, pp. 1–40.

Su et al., "The Virtual Panl Architecture: A 3D Gesture Framework," 1993, IEEE, pp. 387–393.

Minsky et al., "Feeling and Seeing: Issues in Force Display," May 1990, ACM 08991–351, pp. 235–242, 270.

Akamatsu et al., "Multimodal Mouse: A Mouse–Type Device with Tactile and Force Display," 1994, Presence, vol. 3, No. 1, pp. 73–80.

Ouh–young, "Creating an Illusion of Feel: Control Issues in Force Display," 1989, Computer Science Dept., Univ. of North Carolina, pp. 1–14.

Gotow et al., "Perception of Mechanical Properties at the Man–Machine Interface," 1987, IEEE, pp. 688–689.

Wiker et al., "Development of Tactile Mice For Blind Access to Computers: Importance ofStimulation Locus, Object Size, and Vibrotactile Display Resolution," 1991, Proceedings of the Human Factors Society $35^{th}$ Annual Meeting, pp. 708–712.

Rosenberg et al., "The use of Force Feedback to Enhance Graphical User Interfaces," 1996, Proc SPIE 2653, 19, pp. 243–248.

Hannaford et al., "Force–Feedback Cursor Control," 11/89, Jet Propulsion Laboratory.

Rosenberg et al., "Commercially Viable Force Feedback Controller for Individuals with Neuromotor Disabilities", 1996, USAF Armstrong Laboratory.

Rosenberg, "Virtual Haptic Overlays Enchance Performance in Telepresence Tasks," 1994, Stanford Univ., Dept. of Mechanical Engineering.

Rosenberg, "Virtual Fixtures as Tools to Enhance Operator Performance in Telepresence Environments," 1993, SPIE.

Russo, "The Design and Implementation of a Three Degree–Of–Freedom Force Output Joystick," May 1990, Dept. of Mechanical Engineering.

Payette et al., "Evaluation of a Force Feedback (Haptic) Computer Pointing Device in Zero Gravity," Oct. 17, 1996, ASME Dynamics Systems, vol. 58 pp. 547–553.

Ramstein, "Combining Haptic and Braille Technologies: Design Issues and Pilot Study," 1996, ACM 0–8991–776.

Kelley, "MagicMouse: Tactile and Kinesthetic Feedback in the Human–Computer Interface using an Electromagnetically Actuated Input/Output Device," 1993, Dept. of Electrical Engineering, Univ. of British Columbia.

Schmult et al., "Application Areas for a Force–Feedback Joystick," 1993, Advances in Robotics, vol. 49, pp. 47–54.

Kelley et al., "On the Development of a Force–Feedback Mouse and its Integration into a graphical user Interface," 11/94, Engineering Congress and Exhibiton, pp. 1–8.

Adachi et al., "Sensory Evaluation of Virtual Haptic Push–Buttons," 1994, Suzuki Motor Corp., pp. 1–7.

Hirota et al., "Development of Surface Display," IEEE 0–7803–1363–1, 1993, pp. 256–262.

* cited by examiner

COMMAND OF FORCE SENSATIONS IN A FORCEBACK SYSTEM USING FORCE EFFECT SUITES

BACKGROUND OF THE INVENTION

The present invention relates generally to interface devices for allowing humans to interface with computer systems and provide force feedback to the user, and more particularly to the control of force sensations output by force feedback interface devices.

Using an interface device, a user can interact with an environment displayed by a computer system to perform functions and tasks on the computer, such as playing a game, experiencing a simulation or virtual reality environment, using a computer aided design system, operating a graphical user interface (GUI), or otherwise influencing events or images depicted on the screen. Common human-computer interface devices used for such interaction include a joystick, mouse, trackball, steering wheel, stylus, tablet, pressure-sensitive ball, or the like, that is connected to the computer system controlling the displayed environment. Typically, the computer updates the environment in response to the user's manipulation of a user-manipulatable physical object ("manipulandum") such as a joystick handle or mouse, and provides visual and audio feedback to the user utilizing the display screen and audio speakers. The computer senses the user's manipulation of the user manipulandum through sensors provided on the interface device that send locative signals to the computer.

In some interface devices, haptic feedback is also provided to the user, also known as "force feedback." These types of interface devices can provide physical sensations which are felt by the user manipulating the physical object of the interface device. For example, the Force-FX joystick controller from CH Products, Inc. or the Wingman Force joystick from Logitech may be connected to a computer and provides forces to a user of the controller. Other systems might use a force feedback mouse controller. One or more motors or other actuators are used in the device and are connected to the controlling computer system. The computer system controls forces on the force feedback device in conjunction and coordinated with displayed events and interactions on the host by sending control signals or commands to the force feedback device and the actuators. The computer system can thus convey physical force sensations to the user in conjunction with other supplied feedback as the user is grasping or contacting the manipulandum of the interface device. For example, when the user moves the manipulandum and causes a displayed cursor to interact with a different displayed graphical object, the computer can issue a command that causes the actuator to output a force on the manipulandum, conveying a feel sensation to the user.

In preferred embodiments, the application program running on the host interacts with a library available on the host which is dedicated to the control and implementation of force feedback using the interface device. Such a library can be, for example, an "Application Program Interface" (API) in the Windows operating system, which are commonly used to provide functionality to an application program; or the equivalent for other systems such as other operating systems or game consoles. Examples of API's include I-Force® and the FeelIt™ API's available from Immersion Corp. of San Jose, Calif. These API's run on the host computer beneath the application program level and respond to high level calls to implement force feedback for force feedback devices and related functions. The application program need only specify particular force sensations by name and parameters which characterize the force sensations using the API's.

Figure 1:
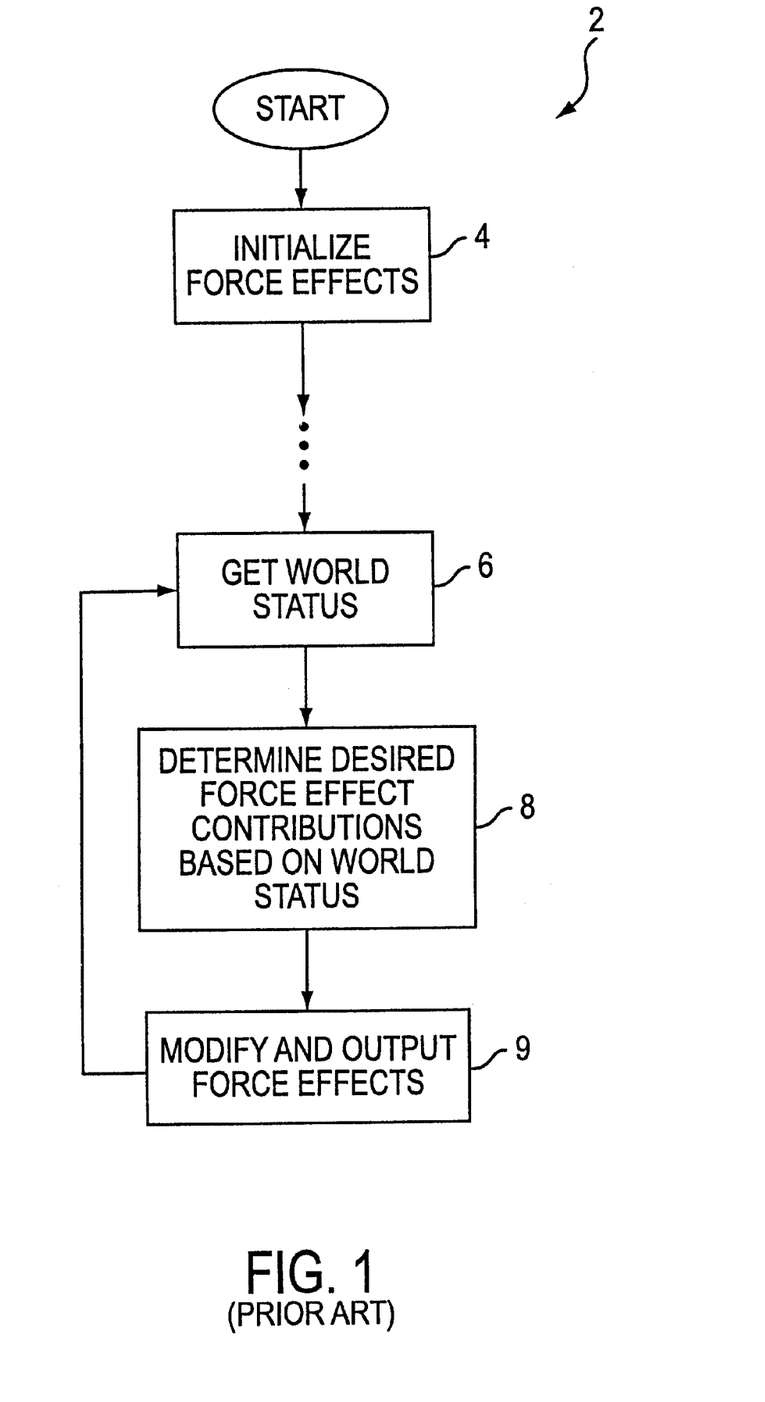
FIG. 1 is a flow diagram illustrating a process of the prior art for an application program to control force feedback effects.

A problem with the prior art development and control of force feedback sensations in software is that the programmer of force feedback application programs must provide control over many different types of individual force sensations ("force effects") and must coordinate this control at a low level. For example, a generalized control process 2 in the prior art is shown in FIG. 1. In an initialization step 4, the application program sends any force effects it desires to be applied to the API, with any basic effect parameters. In some embodiments, these basic effect parameters can be read by the API from a standardized file, such as an "IFR" file, that specifies the force effects and their parameters and which the API interprets to load force effect data on the device.

The application program then processes steps in the running of the application program. One of these steps is step 6, where the application checks the "world status" of the program with respect to force feedback. The world status changes based on time, user input, input from other sources, random events, and other criteria. For example, a user controlled graphical object or entity may have been moved from one region into another in a graphical environment, and the world status reflects this movement. In step 8, the application program determines the contributions for each desired force effect that is to be output based on the current world state. Thus, the application program must determine which individual force effects should be played, as well as determine the particular parameters for these force effects based on the current world status, such as duration, magnitude, direction, frequency, etc. In step 9, the application program modifies and commands force effects so that the force effects are output to the force feedback device. This is accomplished by sending force effect commands with the desired parameters and changes. The API and lower-level drivers receive the force effect commands and translate those commands into data which the force feedback device can interpret. The force feedback device outputs force sensations in accordance with the commands. The process on the host computer then returns to step 6 to get the latest world status. This process loop should run on the order of 30 times per second to provide adequate force feedback.

In the example above, the application program must perform many detailed individual force-feedback related tasks that the designer of the application program must work out and implement. The degree of attention required to implement such low-level handling of force effects takes away from other aspects of the design of the application program, and/or causes the designer to cut back on the implementation of the force feedback in the program, leading to less immersive and compelling force sensations in application programs.

SUMMARY OF THE INVENTION

The present invention is directed to commanding force effects using suites or categories to allow an application program higher level control over force sensations output by a force feedback interface device.

More particularly, a method of the present invention for commanding force effects using force suites is described. The force effects are commanded by an application program running on a host computer, and the host computer is coupled to a force feedback interface device that outputs force sensations to a user. An application program associates a force suite with one or more individual force effects and the suite association is provided to a library available to the application program on the host computer, such as an Application Programming Interface (API). A set of rules is also preferably provided to the library, the rules determining how to apply the force effects in the suite based on a status of the application program. The application program commands at least one force effect in the suite and reports the status of the application program to the library, where the library applies the rules based on the reported status to cause a force sensation based on the commanded force effect to be output by the force feedback interface device.

For example, the status of the application program can include calling the suite to be loaded to memory on the force feedback interface device, where the library determines whether any of the force effects in the loaded suite are to be output to the user. Or, the status of the application program includes a location of a user-controlled entity in the application program, such as a cursor or a character in a game, which allows the library to determine suites and effects by applying the location to the rules.

The suites and the force effects within the suites can also be provided with priorities to help the library determine which suites and/or force effects should be output if there is a conflict or a limitation in the force feedback system that requires that some force effects not be loaded or played.

The present invention advantageously provides an application program with force effect suites in which to organize force effects for more simplified and effective command of force sensations. The application program need only report a minimum of information to a library, such as a world status of the application, and the library can determine which effects should be loaded and/or output based on the world status. This allows an application program developer to concentrate on the force design itself to a greater extent without spending resources on lower level management of force effects by the application program. Priority levels assigned to suites and force effects also allow the library to handle conflicts in force effects and limitations in device hardware without direct supervision from the application program.

These and other advantages of the present invention will become apparent to those skilled in the art upon a reading of the following specification of the invention and a study of the several figures of the drawing.

BRIEF DESCRIPTION OF THE DRAWINGS

FIG. 4b is a flow diagram illustrating a process of the present invention for a library to control force feedback in conjunction with the process of FIG. 4a.

DETAILED DESCRIPTION OF PREFERRED EMBODIMENTS

Figure 2:
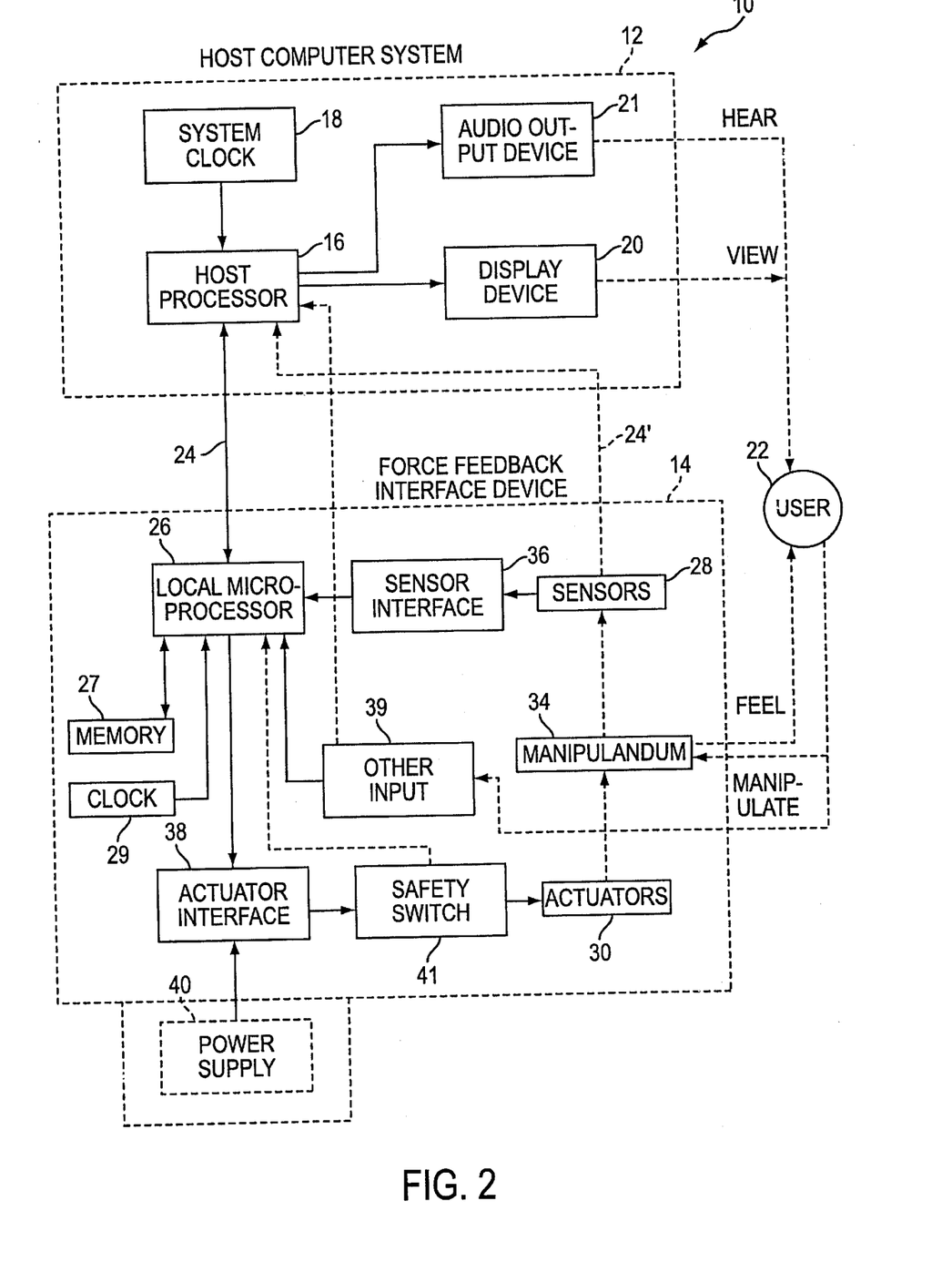
FIG. 2 is a block diagram of a system for providing force feedback to a user and suitable for use with the present invention.

FIG. 2 is a block diagram illustrating a force feedback interface system 10 for use with the present invention controlled by a host computer system. Interface system 10 includes a host computer system 12 and an interface device 14.

Host computer system 12 is preferably a personal computer, such as an IBM-compatible or Macintosh personal computer, or a workstation, such as a SUN or Silicon Graphics workstation. Alternatively, host computer system 12 can be one of a variety of home video game systems, such as systems available from Nintendo, Sega, or Sony, a television "set top box" or a "network computer", etc. Host computer system 12 preferably implements a host application program with which a user 22 is interacting via peripherals and interface device 14. For example, the host application program can be a video or computer game, medical simulation, scientific analysis program, operating system, graphical user interface, or other application program that utilizes force feedback. Typically, the host application provides images to be displayed on a display output device, as described below, and/or other feedback, such as auditory signals.

Host computer system 12 preferably includes a host microprocessor 16, a clock 18, a display screen 20, and an audio output device 21. Microprocessor 16 can be one or more of any of well-known microprocessors. Random access memory (RAM), read-only memory (ROM), and input/output (I/O) electronics are preferably also included in the host computer. Display screen 20 can be used to display images generated by host computer system 12 or other computer systems, and can be a standard display screen, CRT, flat-panel display, 3-D goggles, or any other visual interface. Audio output device 21, such as speakers, is preferably coupled to host microprocessor 16 via amplifiers, filters, and other circuitry well known to those skilled in the art (e.g. in a sound card) and provides sound output to user 22 from the host computer 12. Other types of peripherals can also be coupled to host processor 16, such as storage devices (hard disk drive, CD ROM/DVD-ROM drive, floppy disk drive, etc.), printers, and other input and output devices. Data for implementing the interfaces of the present invention can be stored on computer readable media such as memory (RAM or ROM), a hard disk, a CD-ROM or DVD-ROM, etc.

An interface device 14 is coupled to host computer system 12 by a bi-directional bus 24. The bi-directional bus sends signals in either direction between host computer system 12 and the interface device. An interface port of host computer system 12, such as an RS232 or Universal Serial Bus (USB) serial interface port, parallel port, game port, etc., connects bus 24 to host computer system 12. Alternatively, a wireless communication link can be used.

Interface device 14 includes a local microprocessor 26, sensors 28, actuators 30, a user object 34, optional sensor interface 36, an optional actuator interface 38, and other optional input devices 39. Local microprocessor 26 is coupled to bus 24 and is considered local to interface device 14 and is dedicated to force feedback and sensor I/O of interface device 14. Microprocessor 26 can be provided with software instructions to wait for commands or requests from computer host 12, decode the command or request, and handle/control input and output signals according to the command or request. In addition, processor 26 preferably operates independently of host computer 12 by reading sensor signals and calculating appropriate forces from those sensor signals, time signals, and stored or relayed instructions selected in accordance with a host command. Suitable microprocessors for use as local microprocessor 26 include the MC68HC711E9 by Motorola, the PIC16C74 by Microchip, and the 82930AX by Intel Corp., for example. Microprocessor 26 can include one microprocessor chip, or multiple processors and/or co-processor chips, and/or digital signal processor (DSP) capability.

Microprocessor 26 can receive signals from sensors 28 and provide signals to actuators 30 of the interface device 14 in accordance with instructions provided by host computer 12 over bus 24. For example, in a preferred local control embodiment, host computer 12 provides high level supervisory commands to microprocessor 26 over bus 24, and microprocessor 26 manages low level force control loops to sensors and actuators in accordance with the high level commands and independently of the host computer 12. The force feedback system thus provides a host control loop of information and a local control loop of information in a distributed control system. This operation is described in greater detail in U.S. Pat. No. 5,734,373, incorporated herein by reference. Microprocessor 26 can also receive commands from any other input devices 39 included on interface apparatus 14, such as buttons, and provides appropriate signals to host computer 12 to indicate that the input information has been received and any information included in the input information. Local memory 27, such as RAM and/or ROM, is preferably coupled to microprocessor 26 in interface device 14 to store instructions for microprocessor 26 and store temporary and other data. In addition, a local clock 29 can be coupled to the microprocessor 26 to provide timing data.

Sensors 28 sense the position, motion, and/or other characteristics of a user manipulandum 34 of the interface device 14 along one or more degrees of freedom and provide signals to microprocessor 26 including information representative of those characteristics. Rotary or linear optical encoders, potentiometers, photodiode or photoresistor sensors, velocity sensors, acceleration sensors, strain gauge, or other types of sensors can be used. Sensors 28 provide an electrical signal to an optional sensor interface 36, which can be used to convert sensor signals to signals that can be interpreted by the microprocessor 26 and/or host computer system 12.

Actuators 30 transmit forces to manipulandum 34 of the interface device 14 in one or more directions along one or more degrees of freedom in response to signals received from microprocessor 26. Actuators 30 can include two types: active actuators and passive actuators. Active actuators include linear current control motors, stepper motors, pneumatic/hydraulic active actuators, a torquer (motor with limited angular range), voice coil actuators, and other types of actuators that transmit a force to move an object. Passive actuators can also be used for actuators 30, such as magnetic particle brakes, friction brakes, or pneumatic/hydraulic passive actuators. Actuator interface 38 can be optionally connected between actuators 30 and microprocessor 26 to convert signals from microprocessor 26 into signals appropriate to drive actuators 30.

Other input devices 39 can optionally be included in interface device 14 and send input signals to microprocessor 26 or to host processor 16. Such input devices can include buttons, dials, switches, levers, or other mechanisms. For example, in embodiments where user object 34 is a joystick, other input devices can include one or more buttons provided, for example, on the joystick handle or base. Power supply 40 can optionally be coupled to actuator interface 38 and/or actuators 30 to provide electrical power. A safety switch 41 is optionally included in interface device 14 to provide a mechanism to deactivate actuators 30 for safety reasons.

Manipulandum ("user object") 34 is a physical object, device or article that may be grasped or otherwise contacted or controlled by a user and which is coupled to interface device 14. By "grasp", it is meant that users may releasably engage, contact, or grip a portion of the manipulandum in some fashion, such as by hand, with their fingertips, or even orally in the case of handicapped persons. The user 22 can manipulate and move the object along provided degrees of freedom to interface with the host application program the user is viewing on display screen 20. Manipulandum 34 can be a joystick, mouse, trackball, stylus (e.g. at the end of a linkage), steering wheel, sphere, medical instrument (laparoscope, catheter, etc.), pool cue (e.g. moving the cue through actuated rollers), hand grip, knob, button, or other object. Mechanisms which may be used to provide the degrees of freedom to the user object include gimbal mechanisms, slotted yoke mechanisms, flexure mechanisms, etc. Various embodiments of suitable mechanisms are described in U.S. Pat. Nos. 5,767,839, 5,721,566, 5,623,582, 5,805,140, 5,825,308, and patent application Ser. Nos. 08/965,720 and 09/058,259, all incorporated herein by reference.

Figure 3:
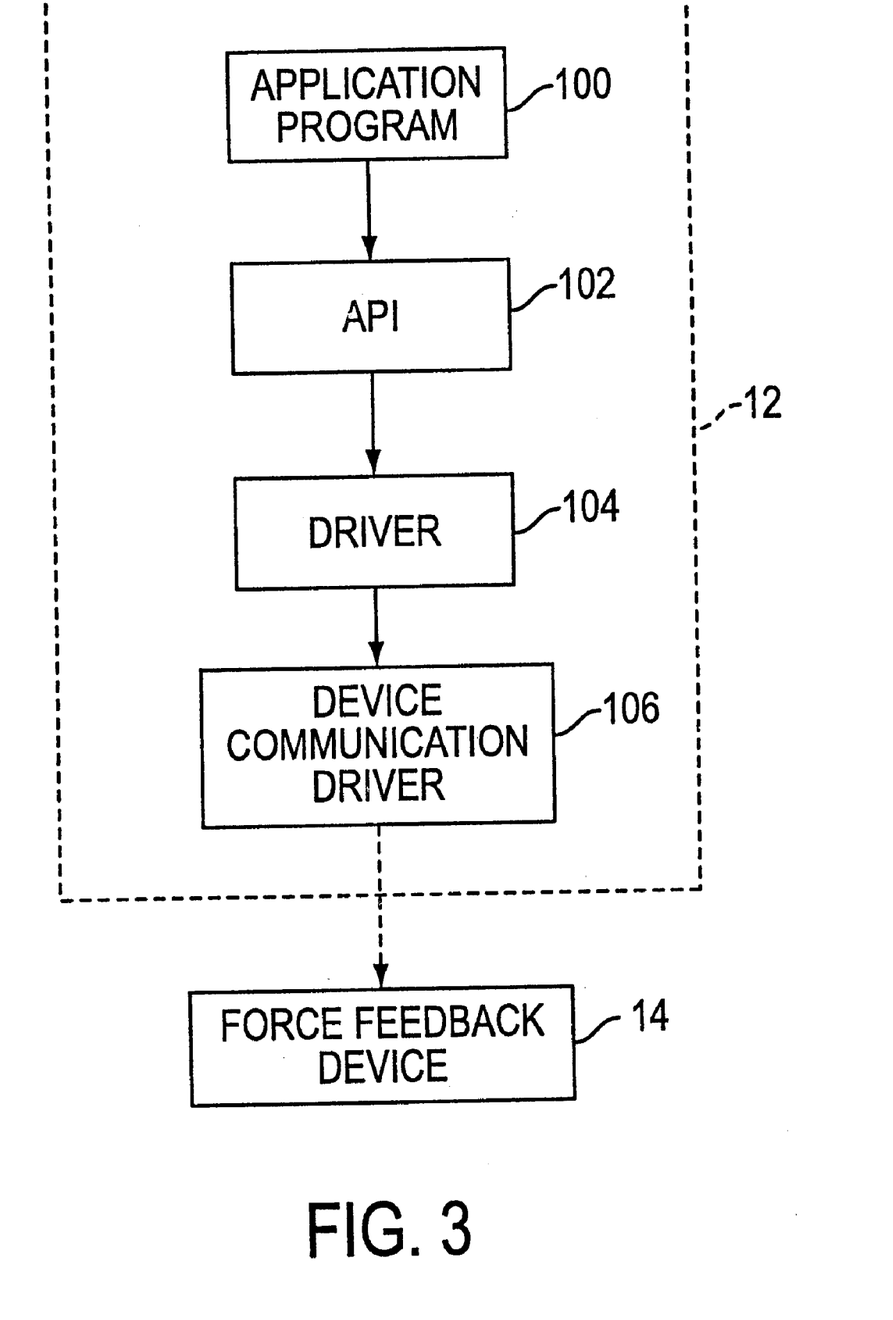
FIG. 3 is a block diagram illustrating a hierarchy of control programs implemented by the host computer in a force feedback system.

FIG. 3 is a block diagram illustrating a hierarchy of programs running on the host computer 12. The programs are preferably implemented in software, e.g. program instructions or code, and such is the embodiment described herein; however, all or part of the hierarchy may also be implemented in hardware, where the conversion of functionality of the software to hardware is well known to those skilled in the art.

Application program 100 is running on the host computer 12 at the highest level. As described above, the application program may be a computer game or video game, medical simulation, scientific analysis program, operating system, graphical user interface (GUI), or other application program that utilizes force feedback. Multiple application programs may be concurrently running on the host computer 12 as well; for example, multiple programs can have force feedback functionality. One embodiment of providing multiple application programs for use with a force feedback device is described in co-pending patent application Ser. No. 08/970,953, filed Nov. 14, 1997 and incorporated herein by reference.

A force feedback library or Application Programming Interface (API) 102 is accessed by the application program 100. API 102 is resident in the host computer's memory and allows a given application program to communicate with lower level drivers and other force feedback functions. Other API's (not shown) for other functions of host computer 12 and various peripherals are also typically running on the host computer. For example, in the Windows operating system, API's are commonly used to allow a developer of an application program to call functions at a high level for use with the application program, and ignore the low level details of actually implementing the function.

The API of the present invention includes a set of software "objects" that can be called to command a force feedback interface device 14. Objects are a set of instructions and/or data which can be called by a pointer and/or an identifier and parameters to implement a specified function. For example, three types of objects are provided in one preferred API implementation: interface objects, device objects, and effect objects. Each of these objects makes use of one or more force feedback device drivers which are implemented as objects in the API 102.

Interface objects represent the API at the highest level. An application program (which is referred to as a "client" of the API) can create an interface object to access lower level objects and code that implement force feedback device functionality. For example, the interface object allows an application program to enumerate and receive information about individual devices and create lower level objects for each device used by the application program. Device objects each represent a physical force feedback device (or other compatible device or peripheral) in communication with the host computer 12. The device objects access the set of force feedback routines to receive information about an associated physical device, set the properties of the physical device, register event handlers (if events are implemented on the host), and to create effect objects.

Effect objects each represent a force effect defined by the application program to be output one or more times on a force feedback device. The effect objects access the set of force feedback routines to download force effects to the force feedback device, start and stop the output of effects by the force feedback device, and modify the parameters of the effects. Event objects can also be created to define events, as described in greater detail below.

The API of the present invention also may implement objects for other structures discussed herein, such as suite or category objects. Individual effect objects may be associated with suite objects which group the effects. Such organization is described in greater detail below.

A "force effect," as referred to herein, is a definition for a force or series of forces that may be commanded within the API (or other driver). The force effect typically has a name (identifier) to identify it and one or more parameters to characterize the force effect as desired. For example, several types of force effects have been defined, including vibrations, enclosures, grids, textures, walls, dampers, snap sensations, vibrations, circles, ellipses, etc. For example, a vibration force effect may have parameters of duration, frequency, magnitude, and direction. Force sensations output to the user from the force feedback device are based upon one or more force effects (e.g., force effects superimposed on each other). Force effects, in turn, can be made up of one or more basic force prototypes, such as springs, dampers, and vector forces. Many force effects are described in co-pending patent applications Ser. Nos. 08/846,011 and 08/877,114, both incorporated herein by reference.

In some embodiments, an application program client interacts with the API 102 by first receiving a pointer to a resident force feedback interface; for example, one such interface includes procedures provided in the Component Object Model (COM) interface of Microsoft Windows, an object oriented interface (embodiments in which host computer 12 is a console game system, for example, may use other software architectures). Using the force feedback interface, the application program enumerates the force feedback devices on the computer system 12. The application program selects a desired one of the force feedback devices and creates a device object associated with that device. Using the force feedback interface, the application then acquires the device, sets the device up with setup and default parameters, and creates effect objects and event objects during the execution of the application program at times designated by the developer of the application. At appropriate times, the application program will command the creation/destruction of force effects and the start, stop, or, pause of the playback of force effects by accessing the appropriate interface instructions associated with the desired effect.

Translation layer 104 manages the sending of effects to the device 14, receives information from the device to the host (in some embodiments), and maintains a representation or model of the memory of device 14. When the application program is first executed by the host computer and loaded into memory, if the application is able to command a force feedback device, the application will query for the API 102. Once communication is established, the API will contact the layer 104 to create force effects commanded by the application program.

The layer 104 receives individual effects as they are created by the application program using API 102 and stores the effects in the memory model. Each effect in the device memory model maintained by the layer 104 defines a force or series of forces that is to be output on the manipulandum 34 by the force feedback device 14. An effect can be created initially when the application program is first executed on the host computer, before any forces are commanded to be output, or the effect can be later created during application execution and then immediately commanded to be played by the force feedback device.

When the effects are to be loaded on the device 14 ("created") by the application, they are selected and copies are output to the device by the layer 104. Preferably, each effect is output by the driver as soon as it is received. Each effect stored in the device memory model as examined by the layer is available on force feedback device 14, i.e., the local microprocessor 26 should recognize the effect and be able to output the effect immediately or when conditions dictate. The device memory model can alternatively be maintained by the API 102 rather than layer 104 or at another level of the host architecture. The details of maintaining a device memory model on the host computer to allow greater efficiency in storing force effects in the memory of the force feedback device is described in greater detail in copending patent application Ser. No. 09/305,872 filed concurrently herewith by Braun et al., entitled, "Memory and Force Output Management for a Force Feedback System", and is incorporated herein by reference.

At a later time, after the layer has stored the effect in the device memory model, an application program may send a command to the API to output or "play" a particular stored force sensation. If the effect has been loaded to the memory of the force feedback device, the API sends the play information to the layer 104 indicating the particular force effect data to be commanded. Similarly, the application program can send a command to the API 102 to stop particular force effects, to pause and resume the effects, to get the status information of an effect, or to destroy an effect.

The layer 104 can also handle events. For example, when a screen position is received from the device 14, the translation layer can check whether any of the conditions/triggers of the active events are met. If so, a message is sent which eventually reaches the associated active or background application program. In alternate embodiments, the microprocessor 26 on device 14 can check for events and send event notifications through driver 104 up to the application program. The layer 104 also can store a device state in memory.

The layer 104 outputs device messages (commands) to the device 14 by way of the next layer, the device communication driver 106. Messages may include force effects to be output and/or any other information such as device identification numbers or instructions from the context driver for an effect (start, stop, pause, reset, etc.)

Device communication driver 106 communicates directly with the force feedback device 14. Device driver 106 receives the device messages from layer 104 and directly transmits the messages to the force feedback device over bus 24, e.g. a USB, in a form the device 14 can understand. The driver 106 is implemented, in the preferred embodiment, as a standard device driver to communicate over such a serial port of host computer 12. Other types of drivers and communication interfaces can be used in other embodiments.

In other embodiments in which multiple application programs can be concurrently running on the host computer, a context layer driver can be used between the API 102 and the layer 104. Such an embodiment is described in greater detail in copending patent application Ser. No. 08/970,953, previously incorporated by reference.

Figure 4A:
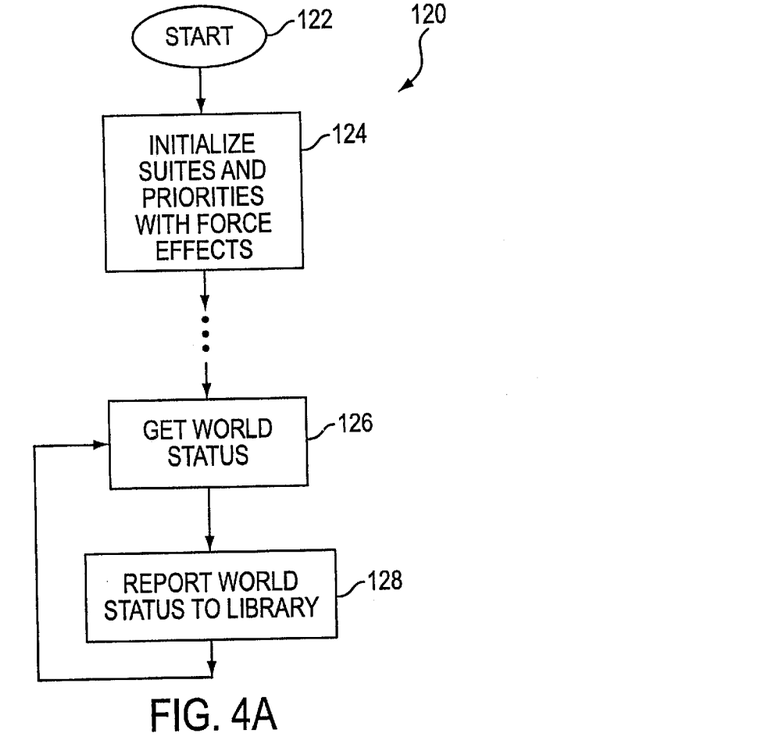
FIG. 4a is a flow diagram illustrating a process of the present invention for an application program to control force feedback effects.

FIG. 4a is a flow diagram illustrating a process 120 of the present invention implemented by the application program 100 for implementing suites of force effects and priorities for use with force effects. The processes herein are implemented using program instructions or code stored on or in a computer readable medium, such as memory (RAM or ROM), magnetic storage media (hard disk, floppy disk, tape, etc.), optical storage media (CD-ROM, DVD-ROM), or other media.

The process starts at 122, and in step 124 the application program initializes force effects, suites, and priorities. The force effect initialization includes similar features to that of the prior art, in which force effects are defined, given parameters, and provided to a library (e.g. API). Herein, the term "library" is intended to refer generically to any program, procedure, or function which runs on the host computer at a lower level than the application program. Thus, the library could be the API 102, a lower level driver included in layer 104, or a driver at a different level. In a preferred implementation, the library is the API 102 or equivalent on other systems for handling direct requests from the application program. The force effect definitions (parameters, etc.) can be provided in one or more standardized files such as "IFR" files created using the I-Force Studio™ development software available from Immersion Corporation. Alternatively, direct library calls can include parameters and other data defining force effects.

In the present process, the application also may initialize suites of force effects, priorities for suites, priorities for force effects, and rules and characteristics governing the suites and force effects by providing data describing these features to the library. A suite of force effects is a category that groups one or more force effects based on the purpose, use, or functionality of the force effects. Multiple suites can be defined which each include different and/or the same force effects. Preferably, the application program provides a name for a suite and designates each force effect included in that suite. For example, one suite for use with a game application program can be designated "On Land", and multiple force effects can be designated to be included in the On Land suite, such as a collision effect, a weapon fire effect, an engine rumble effect, and a "slight breeze" effect. These effects are intended to be available to the force feedback device when the On Land suite is active or "on." A second suite may also be defined, named "In Water." This suite can be associated with a water resistance (damping) effect, an explosion effect, a "strong current" effect, and a "hitting sea kelp" effect. These effects are to be available to the force feedback device when the In Water suite of effects is active. A suite may include any number of force effects desired by the developer of the application program.

Furthermore, in some embodiments a suite can be designated varying degrees of activity. For example, instead of designating a first suite to be 100% active and a second suite to be 0% active, the first suite can be 75% active and the second suite can be 25% active. The percentage of activity can modify the output force sensations in the suite according to any number of rules as specified by the developer of the suite. For example, the percentage can designate a gain for each of the force effects in the suite, so that a 50% active designation would reduce the magnitude for all the force sensations by half of the magnitude they would normally be output at 100% activity. Alternatively, the rules may specify that the activity level governs other characteristics of the force effects instead of or in addition to the magnitude, such as the frequency of periodic force effects, the duration, or constant values such as spring or damping constants. Thus, for example, the On Land and In Water suites described above can be simultaneously active if desired. The player might be controlling a character in a game walking from land into a lake, where the On Land activity level gradually decreases while the In Water suite activity level gradually increases as the character moves deeper into the water.

Priorities may also be assigned to the suites and/or to the individual force effects. The priorities can indicate which suite or force effect should be output at the expense of another suite or force effect if there is a conflict or if only one may be output at a given point in time. For example, the suites On Land and In Water can be given a suite priority of 2, while a different suite named "Wounded" can be given a suite priority of 1. This may indicate that if in a game the player's character or avatar becomes wounded, the force effects associated with the Wounded suite should be output over the force effects associated with the lesser-priority On Land or In Water suites. This may be because the designer believes that the Wounded force effects are more important than the others to immersive force feedback. Similarly, force effects can be assigned effect priorities. For example, the collision effect and weapon fire effects can be designated priority 1, the engine rumble effect can be designated priority 2, and a "slight breeze" effect can be designated priority 3. The "In Water" effects can also be assigned priorities, such as the water resistance (damping) effect and explosion effect as priority 1, a "strong current" effect as priority 2, and "hitting sea kelp" as priority 4. These priorities can indicate which force effect has precedence to be output to the user should there be a conflict with a different force effect, e.g. if only one of the multiple force effects can be output due to device limitations, program limitations, etc. One of these device limitations may be limited device memory, as explained below. Preferably, the developer can designate priorities for suites and effects; alternatively, default priorities for standardized force effects and suites can be used.

Rules and characteristics of the suites and force effects may also be designated in the initialization stage. The rules indicate to the library how to apply and manage the various defined suites and force effects. The rules can be as simple as instructing the library to load a particular suite of effects into device memory when the suite is called by the application program. Or, more complex rules can be provided, such as indicating a sequence of suites that are to be made active in succession, where each remains active for a specified time period. For example, a rule can be associated with the In Water suite, such that when the application program indicates to the library that the world status is "water" (see below), the In Water suite effects are to be used in place of the On Land suite of effects (if the On Land suite was previously being used). Furthermore, the rules can indicate that the water resistance effect in the In Water suite is to be output immediately and at all times during which the world status is "water." The water resistance effect can provide a damping force on the user manipulandum whenever the manipulandum is moved and thus can simulate the user moving through water. Other rules might include lookup tables which the library can consult based on data provided by the application program, such as distance or size of events (described in greater detail below).

Yet other rules might include a method for "blending" different force effects, whether the force effects are in a suite or not. For example, one periodic force effect having a source wave of a sine wave can be slowly changed into a different type of periodic force effect, e.g. an effect having a source wave of a square wave. The rules can instruct the library to gradually change parameters over a specified time period, from a starting to an ending magnitude and/or direction, from one type of force effect to another type of force effect, and/or based on other specified parameters. This can allow smooth transitions between different force effects.

The force effect, suite, priority, and/or rules data can be provided to the library (e.g. API) in the step 124 from the application program so that the library can organize the effects, suites, and rules and interpret them during execution, as described below. For example, the application program can send a command and the name of a suite. Data can be provided to indicate which force effects are included in the suite and specify any rules and/or priorities associated with the suite.

It should also be noted that data provided in the initialization step 124 can also be provided to the library at other times during execution of the application program. For example, the application may wish to create a suite of force effects at a later stage in a game when the previously-used suites are no longer needed. The application program simply provides a command (calling the library) to destroy an old suite and/or create a new suite, or may create/destroy individual effects. In some embodiments, the application is also capable of changing priorities of suites and effects during any stage of application program execution.

After the initialization step, the process 120 at some point is updating the application and reaches step 126, in which the application gets the "world status", which is the current state of events and objects in the application program. For example, the world status can include the current location of a user-controlled graphical object or entity in a graphical environment displayed by the application program. Thus, a game program in which the player controls the movement of a character viewed from a first person perspective through corridors of a virtual building has a world status that includes the current location of the player's character in the building and the distances to surrounding objects, the state of the character's health, the state of the player character's equipment (e.g. firing a gun), any locations of other computer-controlled entities (e.g. enemy characters), the time elapsed from a designed mark, the size and location of explosions occurring, etc. In a different graphical user interface embodiment, the user controls a cursor to select icons, menu items, windows, text objects, etc. The world state in such an embodiment can include the current location of the user-controlled cursor, the status of any buttons on the manipulandum which can be pressed by the user, the location of program windows which may be displayed, and any other events which may occur.

After the world status is determined, the process reports the world status to the library (e.g. API) in step 128. The world status report can be modified to be applicable to the force feedback library and/or to the rules provided in the initialization step 124. For example, instead of reporting the location of the player character as coordinates in the virtual world, the program can simply report "water" or the equivalent if the player character is located in a body of water, which tells the library to use the In Water suite of force effects. Likewise, if the character is located on land, a status of "land" can be reported to the library. Other states such as "wounded", "healthy," "in a texture region," "within boundary of a window," "hit by bullets," "pressing button," "out of fuel," etc. can be reported, which cause the suite of effects associated with the reported state to be used. In another example, the application program can send an indication that a particular localized event has occurred and the distance of the event from the player controlled object or entity. The library could then determine the forces, if any, that should be output based on the event and the distance. For example, the application program can report that an explosion has occurred 50 feet from the player character, and leave the determination of the force effects and parameters up to the library to determine based on earlier-provided rules. Thus, in different embodiments, varying levels of detail in the status may be reported to the library; greater levels of detail, such as the particular locations of events or objects, allow the library to determine which effects are appropriate according to the specified rules. In some embodiments, processing can be distributed in this way between the application program and the library as desired by the application program developer.

After step 128, the process returns to step 126 to get the latest world status. Of course, many other steps involved in the execution of the application program and communicating with the force feedback device are omitted for explanatory purposes.

The use of suites as described above allows the application program to offload much of the lower-level force effect management to a library (e.g. an API) or other low-level driver. The application need only set up the suites and priorities at the beginning initialization stage; thereafter, the application program is not required to determine which particular force effects should be loaded to the device and/or output based on the current world status. The program need only report the world status, and the library determines which effects should be loaded on the device and/or played by the device. Furthermore, the application program is able to command large numbers of effects at once with simple commands, since it need only command that a suite be loaded and/or played, and not each individual effect. In addition, this may potentially increase the performance of the system in some embodiments if the library can handle the control of force effects more efficiently for the force feedback device than most application programs, e.g. if the library knows particular characteristics of force feedback devices of which the application program is ignorant.

Figure 4B:
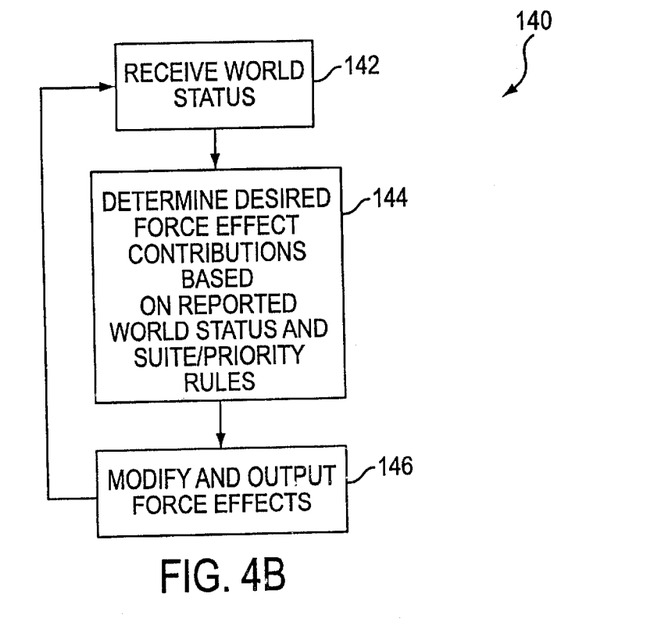

FIG. 4b is a flow diagram illustrating a process 140 implemented by the library (e.g. API or a lower level driver on the host computer) in response to the reporting of the world state by the application program in step 128 of process 120 in FIG. 4a. Process 140 is implemented using program instructions or code stored on a computer readable medium, such as memory (RAM or ROM), magnetic storage media (hard disk, floppy disk, tape, etc.), optical storage media (CD-ROM, DVD-ROM), etc.

In step 142, the process receives a world status or state from the application program, as described above. In step 144, the process determines the desired force effect contributions based on the reported world status and on suite and priority rules and characteristics. As explained above, the application program can provide rules to the library for suites and force effects. Following these rules, the library can determine which force effects should be "created" (e.g., loaded to the device memory) and which of those created force effects should be output to the user. Using the In Water suite, the rules can instruct the library that three of the four effects in that suite are always on, while the fourth effect might only be output based on particular conditions in the world status or when receiving a "play" command from the application program. In the example above in which the application program reports a size of an explosion and the distance to the explosion, the library can consult rules earlier provided by the application program for selecting a suite or force effect. For example, the program might have earlier provided rules including a table of distance ranges and the magnitude of an explosion force effect at each of the ranges, where if the distance is over a particular threshold, no explosion force effect is output at all.

The rules followed by the library can be provided by the application program in the initialization step 124 described above (or at other steps). Alternatively, some or all of the rules can be default or standardized rules which are included in the library and which need not be provided by an application program. For example, if a standard set of force effects have widelyused rules, those rules can be default rules. This allows a program developer to put even less effort into the force feedback control in the application program, if he or she so desires. If an application program wishes to use different rules, the default rules can be overridden (or modified) by application-supplied rules and commands. Priorities can also be either supplied by an application program or retrieved from a default database for standard force effects and suites.

In step 146, the library modifies and/or outputs the force effects determined to be active in step 144. For example, the library can check each suite of effects that is active and "create" those effects by loaded the effect data into the memory of the force feedback device. The library can also determine which force effects in each suite, if any, are to be output. If any are to be output, a "play" command can be sent to the device to play those particular force effects. If one or more of the suites cannot fit into the available device memory, the library can examine the priorities of each suite to determine which suite should be loaded; the higher priority suite would be loaded before a lower priority suite. Also, the library can examine the priority of each effect in a suite to determine which effects should be loaded (if all of the effects of a suite cannot fit in device memory, for example). The library may examine a device memory model provided in host memory to determine available memory space, as described above and in copending patent application Ser. No. 0/305,872, filed concurrently herewith. This copending application also describes priorities in greater detail, which can be applied to the present invention as well. Priorities can also be used for other, non-memory implementations. For example, the priority of a suite might determine if it should be active or output when other forces or suites are output. In some cases, if too many force sensations are output simultaneously, then individual force effects may blend together into "noise" and no particular effect will be felt by the user. The developer can use priorities to reduce the number of simultaneous force effects in specified circumstances so that a desired force effect will be felt by the user and not become lost in the output of several force effects.

After step 146, the process returns to step 142 to receive a world status from the application program (or to determine force effects in step 144 if no new world status has yet been received). Of course, the library can be performing other steps not explicitly shown in process 140.

The suites and priorities features described above are also applicable to memory management of force effects. For example, in an embodiment providing host caching of force effects to allow greater numbers of effects to be played than can fit in device memory, the suites can categorize particular force effects and simplify the process of swapping out different force effects from device memory. This embodiment is described in greater detail in copending patent application Ser. No. 09/305,872, entitled, "Memory and Force Output Management for a Force Feedback System" and filed concurrently herewith.

While this invention has been described in terms of several preferred embodiments, it is contemplated that alterations, permutations and equivalents thereof will become apparent to those skilled in the art upon a reading of the specification and study of the drawings. Furthermore, certain terminology has been used for the purposes of descriptive clarity, and not to limit the present invention. It is therefore intended that the following appended claims include all such alterations, permutations, and equivalents as fall within the true spirit and scope of the present invention.

What is claimed is:

1. A method for commanding force effects using force suites, said force effects commanded by an application program running on a host computer, said host computer in communication with a force feedback interface device that outputs force sensations to a user, the method comprising:

providing data to a library available to said application program on said host computer, said data indicating a force suite to be used with said application program, wherein said force suite refers to a plurality of force effects that are associated with said force suite; and reporting a status of said application program to said library, said status describing one or more events or objects in said application program, wherein said library uses rules that define how to apply said force effects referred to by said force suite based on said status of said application program, wherein said library causes the command of at least one force effect in said suite by applying said rules based on said reported status to cause a force sensation based on said commanded force effect to be output by said force feedback interface device.

2. A method as recited in claim 1 wherein said library is an Application Programming Interface (API).

3. A method as recited in claim 1 further comprising calling said suite to be loaded to memory on said force feedback interface device based on said status of said application program, wherein said library determines whether any of said force effects in said loaded suite are to be output to said user.

4. A method as recited in claim 1 wherein said status of said application program includes a location of a user-controlled entity in said application program.

5. A method as recited in claim 1 wherein a priority is provided to said library to be associated with at least one of said force effects.

6. A method as recited in claim 5 wherein at least two force effects in a suite have different priorities.

7. A method as recited in claim 1 wherein said rules indicate when said suite is to be active and when said suite is to be inactive, such that when said suite is active said force effects in said suite can be loaded to said force feedback interface device and are available to be output by said force feedback interface device.

8. A method as recited in claim 7 wherein said suite can be designated to be partially active.

9. A method as recited in claim 1 further comprising sending a command to said library to designate that said suite is to be active, such that when said suite is active said force effects in said suite are loaded to said force feedback interface device and are available to be output by said force feedback interface device.

10. A method as recited in claim 1 wherein said force sensation caused to be output by said library is a blend of two of said force effects included in said suite.

11. A method as recited in claim 1 further comprising providing data associating a second force suite with a plurality of force effects.

12. A method as recited in claim 11 wherein a priority is provided to said library to be associated with at least one of said force suites.

13. A method as recited in claim 12 wherein at least two force suites have different priorities.

14. A computer readable medium including program instructions for implementing force effects using force suites, said force effects commanded by an application program running on a host computer, said host computer in communication with a force feedback interface device that outputs force sensations to a user, said program instructions performing steps comprising:

receiving data from said application program running on said host computer, said data indicting a force suite that is associated with at leas one force effect and is to be used with said application program;

receiving a status of said application program from said application program, said status describing one or more events or objects in said application program; and commanding a force effect of said force suite that causes a force sensation to be output by said force feedback interface device, said force effect being based on application of rules and based on said received status, said rules defining how to command said force effects associated with said force suite based on said received status of said application program.

15. A computer readable medium as recited in claim 14 further comprising receiving said rules from said application program.

16. A computer readable medium as recited in claim 15 said status includes a designation relating to said suite and indicating said at least one force effect associated with said suite is to be loaded to memory on said force feedback device.

17. A computer readable medium as recited in claim 15 further comprising determining based on said status whether said suite is active such that said at least one force effect associated with said suite is available on said force feedback device to be output.

18. A computer readable medium as recited in claim 14 further comprising receiving a command from said application program to designate said suite as active such that said at least one force effect associated with said suite is available on said force feedback device to be output.

19. An apparatus for implementing force effects using force suites, said apparatus comprising: =means for implementing the association of a force suite with a plurality of force effects, wherein said force effects are capable of being separately output, said means for implementing comprising a set of rules that determine how to output said force effects in said suite based on a status of an application program running on a host computer, said status describing one or more events or objects in said application program, said force effects to be output as force sensations by a force feedback device in communication with said host computer; and means for receiving said stats of said application program, said means for receiving able to cause all output of at least one force effect in said suite based on said status of said application program and said rules, to cause a force sensation to be output to a user by said force feedback interface device in communication with said host computer.

20. An apparatus as recited in claim 19 wherein said means for implementing includes an application program provided computer readable medium and running on said host computer, and wherein said means for received is a library provided in a computer readable medium available to said application program.

21. An apparatus as recited in claim 20 wherein said library is an Application Programming Interface (API).

22. An apparatus as recited in claim 20 wherein said application program is a game program.

23. An apparatus as recited in claim 19 wherein said host computer is a video game console system.

24. A method for commanding, a force effect on a force feedback interface device that is capable of providing force sensations to a user, the method comprising:

receiving data associating a force suite with a plurality of force effects, said data received at a library available to an application program on a computer, wherein said force effects are capable of being separately output;

receiving data related to a status of the application program said status describing one or more events or objects in said application program; and activating, partially activating, or inactivating the force suite based on the data related to the status of the application program such that when said suite is at least partially active said force effects associated with said suite can be loaded to said force feedback interface device and are available to be output by said force feedback interface device.

25. A method as recited in claim 24 further comprising providing data associating a second force suite with a plurality of force effects.

26. A method as recited in claim 25 further comprising activating, partially activating, or inactivating the second force suite based on the data related to the status of the application program.

* * * * *